United States Patent
Zhao et al.

(10) Patent No.: US 11,753,066 B2
(45) Date of Patent: Sep. 12, 2023

(54) MULTIFUNCTIONAL ELECTRIC RECIRCULATING BALL STEERING SYSTEM FOR COMMERCIAL VEHICLES AND CONTROL METHOD THEREOF

(71) Applicant: NANJING UNIVERSITY OF AERONAUTICS AND ASTRONAUTICS, Nanjing (CN)

(72) Inventors: Wanzhong Zhao, Nanjing (CN); Ziyu Zhang, Nanjing (CN); Chunyan Wang, Nanjing (CN); Xiaochuan Zhou, Nanjing (CN); Gang Wu, Nanjing (CN); Zhongkai Luan, Nanjing (CN); Yulin Ye, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/924,332

(22) PCT Filed: Dec. 15, 2021

(86) PCT No.: PCT/CN2021/138214
§ 371 (c)(1),
(2) Date: Nov. 9, 2022

(87) PCT Pub. No.: WO2022/227601
PCT Pub. Date: Nov. 3, 2022

(65) Prior Publication Data
US 2023/0120929 A1     Apr. 20, 2023

(30) Foreign Application Priority Data
Jun. 30, 2021   (CN) .......................... 202110735013.3

(51) Int. Cl.
*B62D 3/08* (2006.01)
*B62D 5/04* (2006.01)
(Continued)

(52) U.S. Cl.
CPC ............... *B62D 3/08* (2013.01); *B62D 5/046* (2013.01); *B62D 5/0421* (2013.01);
(Continued)

(58) Field of Classification Search
CPC ........ B62D 3/08; B62D 5/0421; B62D 5/046; B62D 15/025; H02K 7/06; H02K 7/08; H02K 16/02
See application file for complete search history.

(56) References Cited

U.S. PATENT DOCUMENTS
2003/0144780 A1    7/2003  Recker et al.

FOREIGN PATENT DOCUMENTS
CN    102673637    9/2012
CN    102717827    10/2012
(Continued)

OTHER PUBLICATIONS

Liu Junrong et al."Brief analysis on the Development of Steering System for New Energy Light Commercial Vehicles" Automobile Applied Technology, Issue 19, pp. 18-19.
(Continued)

*Primary Examiner* — Jacob D Knutson
(74) *Attorney, Agent, or Firm* — Treasure IP Group, LLC

(57) ABSTRACT

A multifunctional electric recirculating ball steering system for commercial vehicles and its control method are described. The system comprises three modules: an electric power module, a mechanical transmission module, and a control module. The system introduces a dual-rotor motor and a common power motor, working together to act on the input end of a recirculating ball steering gear. The dual-rotor
(Continued)

motor offers high redundancy, increased output torque, and improved reliability for control-by-wire operations. A fork assembly enables synchronous and asynchronous rotation of the dual rotors, achieving both steer-by-wire and electric power steering functions. Leveraging the high reduction ratio capability of the recirculating ball steering gear maximizes power torque and simplifies the system architecture while ensuring reliability in both traditional control and control-by-wire functionalities.

10 Claims, 3 Drawing Sheets

(51) Int. Cl.
*B62D 15/02* (2006.01)
*H02K 7/06* (2006.01)
*H02K 7/08* (2006.01)
*H02K 16/02* (2006.01)

(52) U.S. Cl.
CPC ............ *B62D 15/025* (2013.01); *H02K 7/06* (2013.01); *H02K 7/08* (2013.01); *H02K 16/02* (2013.01)

(56) References Cited

FOREIGN PATENT DOCUMENTS

| | | | | |
|---|---|---|---|---|
| CN | 104309684 | | 1/2015 | |
| CN | 106741127 | | 5/2017 | |
| CN | 106741139 | | 5/2017 | |
| CN | 106741139 A | * | 5/2017 | ........... B62D 5/0409 |
| CN | 107310623 | | 11/2017 | |
| CN | 107901979 | | 4/2018 | |
| CN | 109017974 | | 8/2018 | |
| CN | 109969255 | | 7/2019 | |
| CN | 109969255 A | * | 7/2019 | |
| CN | 110282006 | | 9/2019 | |
| CN | 110949496 | | 4/2020 | |
| CN | 113335371 | | 9/2021 | |
| WO | 2020111997 | | 6/2020 | |

OTHER PUBLICATIONS

Xu Kai. "Design of Recirculating Ball type Electric Power Steering Gear." Auto Manufacturing Engineer, Issue 4.p. 25-29.

* cited by examiner

MULTIFUNCTIONAL ELECTRIC RECIRCULATING BALL STEERING SYSTEM FOR COMMERCIAL VEHICLES AND CONTROL METHOD THEREOF

TECHNICAL FIELD

The present disclosure belongs to the technical field of automotive mechanical steering, and particularly relates to a multifunctional electric recirculating ball steering system for commercial vehicles and a control method thereof.

BACKGROUND ART

A hydraulic power steering (HPS) system is the commonly used steering system design for existing commercial vehicles. Compared with a purely mechanical steering system, the HPS system has the advantages of mature and reliable technology, low cost, and capacity of effectively alleviating hard steering. However, the HPS system has poor steering stability at high speed, hard steering at low speed such as turning around in place, and other problems. In order to solve the problems, experts and scholars have proposed an improved electronically controlled hydraulic power steering (ECHPS) system and an electro-hydraulic power steering (EHPS) system based on the HPS system. Although the new technology has alleviated the problems of the original steering system to a certain extent, since the ECHPS system and EHPS system are still based on hydraulic transmission technology, on the one hand, energy consumption thereof is still high; and on the other hand, due to limited electrification thereof, it is difficult to achieve accurate tracking and control, or meet the needs of intelligent and networked vehicles in the future.

An electric power steering (EPS) system is a power steering system that directly relies on a motor to provide auxiliary torque. Compared with the traditional hydraulic power steering (HPS) system, the EPS system has the advantages of low energy consumption, desirable road sensing adjustability, compact structure, ease of maintenance, fast response, desirable system matching and the like. The EPS system complies with all the requirements of people for a steering system. Steer-by-wire power produced after the removal of mechanical connection should represent the ultimate form of the steering system, but it is still in the preliminary stage of research, and there is still a lot of room for research.

It can be seen that in order to meet the current development trend of vehicle intelligence and energy saving, a steering system for commercial vehicles may inevitably develop towards electrification and wire-based control. However, due to the large mass of commercial vehicles, high-power motors or a multi-motor assisted mode is mostly adopted in current researches for technical implementation of electrification of the steering system for commercial vehicles. In addition, steer-by-wire technology for commercial vehicles is also researched and developed to meet the intelligence of commercial vehicles. However, the current researches on electric power steering technology for commercial vehicles have the defects of complex structure, low steering power and poor reliability of the steer-by-wire technology. Moreover, most of the current researches are aimed at a single object, without considering the driver's adaptability for technology replacement, which may lead to discontinuous development of steering technology for commercial vehicles, and it is difficult for drivers to quickly adapt to emerging technologies. It can be seen that there is a lack of a multifunctional electric power steering system which integrates the functions of steer-by-wire and electric power steering and is suitable for commercial vehicles.

SUMMARY OF THE INVENTION

In view of the above defects of the prior art, the present disclosure aims to provide a multifunctional electric recirculating ball steering system for commercial vehicles and a control method thereof, so as to solve the problem that in the prior art, power for electric power steering of commercial vehicles is low, reliability of steer-by-wire is poor, and a steering system is simplex in function and may not adapt to the future development of vehicles. According to the present disclosure, a dual-rotor motor and a common power motor are used in conjunction to act on an input end of a recirculating ball steering gear, the dual-rotor motor has high redundancy, high output torque and desirable control-by-wire reliability, and a fork assembly is additionally installed on the dual-rotor motor for synchronous and asynchronous rotation of dual rotors, such that steer-by-wire and electric power steering functions are achieved, the high reduction ratio capability of the recirculating ball steering gear is taken into full play, the power torque of the system is maximized, the electric power function is achieved, the system is simplified, and system reliability is ensured while the control-by-wire function is provided.

To achieve the above purpose, the technical solution adopted by the present application is as follows:

a multifunctional electric recirculating ball steering system for commercial vehicles, including: an electric power module, a mechanical transmission module and a control module;

the electric power module includes: a dual-rotor motor module and a power motor;

the dual-rotor motor module includes: a rotor A, a top cover, a stator, a stator winding A, a stator winding B, permanent magnets, bearings, a bearing block, a rotor B, a synchronizing ring, a shift fork nut, a shift fork screw, a shift fork drive motor, and a bottom cover;

the top cover and the bottom cover are installed at two ends of the stator respectively;

the stator winding A and the stator winding B are wound inside the stator;

the permanent magnets are installed on the rotor A and the rotor B respectively;

the rotor A is located in an inner cavity of the stator, two ends of the rotor A are sleeved with the bearings respectively, one end is supported in the top cover, and the other end is supported on the bearing block;

the rotor B is located in the inner cavity of the stator, two ends of the rotor B are sleeved with the bearings respectively, one end is supported in the bottom cover, and the other end is supported on the bearing block;

two ends of the synchronizing ring are in floating connection with the rotor A and the rotor B respectively;

the shift fork nut is screwed on the shift fork screw, and a free end of the shift fork nut acts on a ring surface of the synchronizing ring;

the shift fork drive motor is fixed outside the stator, and an output end of the shift fork drive motor is fixedly connected to an input end of the shift fork screw;

the mechanical transmission module includes: a steering wheel, a steering shaft, couplings, a recirculating ball steering gear, a gear sector, a gear sector shaft, a steering drag link, a steering tie rod, a steering knuckle arm, a left tie rod arm, a right tie rod arm, a left steering knuckle, a right steering knuckle, a left wheel and a right wheel;

the recirculating ball steering gear includes: a steering screw, a steering nut, a conduit, and recirculating balls;

the conduit is installed in the steering nut, and the plurality of recirculating balls are disposed in the conduit;

the steering nut is screwed on the steering screw, and the steering nut and the steering screw transmit power via the recirculating balls; the steering nut is engaged with the gear sector;

an input end of the steering shaft is connected to the steering wheel, and an output end of the steering shaft is connected to an output end of the rotor A via the coupling;

one input end of the steering screw is connected to an output end of the rotor B via the coupling, and the other input end of the steering screw is connected to an output end of the power motor via the coupling;

the gear sector is fixed to the gear sector shaft for transmission of power output by the steering nut;

an input end of the steering drag link is connected to the gear sector shaft, and an output end of the steering drag link is connected to the steering knuckle arm;

the left steering knuckle is connected to the left wheel, and the steering knuckle arm and the left tie rod arm are fixed to the left steering knuckle;

two ends of the steering tie rod are connected to the left tie rod arm and the right tie rod arm respectively;

the right steering knuckle is connected to the right wheel, and the right tie rod arm is fixed to the right steering knuckle;

the control module includes: an electronic control unit, torque sensors, a vehicle speed sensor, a steering angle sensor and current sensors;

an input end of the electronic control unit is electrically connected to the torque sensor, the vehicle speed sensor, the steering angle sensor and the current sensor respectively, an output end of the electronic control unit is electrically connected to the power motor and the dual-rotor motor module respectively, and steering function selection and power control are performed according to vehicle and system state parameters obtained from each sensor during steering;

the torque sensors are installed on the output ends of the steering shaft, the rotor A, the rotor B and the power motor respectively, to obtain torque signals and to transmit the torque signals to the electronic control unit;

the vehicle speed sensor is installed on a vehicle for transmitting an obtained vehicle speed signal to the electronic control unit;

the steering angle sensor is installed on the steering wheel for obtaining a steering wheel angle signal when the vehicle is steered, and transmitting the angle signal to the electronic control unit; and the current sensors are installed in the stator winding A, the stator winding B and the power motor respectively, for obtaining current signals in an installation circuit and transmitting the current signals to the electronic control unit.

Further, the stator winding A and the stator winding B in the dual-rotor motor module have different numbers of coil turns and lengths, that is, output torque of the rotor A is different from output torque of the rotor B, and the output torque of the rotor A is smaller than the output torque of the rotor B.

Further, the synchronizing ring is in floating connection with the rotor A and the rotor B via a spline.

Further, the shift fork drive motor is a low-power direct current motor.

Further, an output end face of the steering nut is processed into a rack shape and is engaged with the gear sector.

Further, it may be ensured that the steering screw in the recirculating ball steering gear is completely symmetrical during manufacturing, and a size is longer than an original size, such that two ends of the steering screw can be connected to the rotor B and the power motor respectively.

Further, a default function selection of the steering system is electric power steering, that is, an initial state of the system is that the synchronizing ring is connected to the rotor A and the rotor B at the same time, and the rotor A and the rotor B are equivalent to a part of the steering shaft.

Further, function selection of the steering system is divided into active selection and passive selection, where active selection may be implemented by setting function selection buttons on the steering wheel, and passive selection is passive safety selection performed by an advanced driver assistance algorithm layer according to a vehicle state.

Secondly, the present application further provides a control method of a multifunctional electric recirculating ball steering system for commercial vehicles. The method is based on the above system, and includes the following steps:

(1) designing a steering power characteristic curve when the steering system is in an electric power steering state, and an ideal variable transmission ratio curve when the steering system is in a steer-by-wire state;

(2) performing function selection for the steering system, controlling, by the electronic control unit, the shift fork drive motor to operate according to a selected function, and performing function switching;

(3) performing, by the electronic control unit, real-time steering control according to the function state of the steering system selected in step (2) in conjunction with the steering power characteristic curve and the ideal variable transmission ratio curve in the different steering function states designed in step (1);

(4) if the steering system is in the steer-by-wire state, performing, by the electronic control unit, real-time fault diagnosis, and performing fault-tolerant control of the steering system according to a type of a system fault; and (5) if the steering system is in the electric power steering state, and it is detected that the vehicle is in a dangerous state and an active intervention operation is required, controlling, by the electronic control unit, the shift fork drive motor to drive the synchronizing ring to immediately disengage from the rotor A, so as to disconnect mechanical connection, and completing the active intervention operation.

Further, the steering power characteristic curve designed in step (1) is a multi-segment power characteristic curve, and a specific expression is:

$$M(v, T_i) = \\ W(v) \times M(T_i) = \begin{cases} 0 & 0 < T_i < 1 \\ 17.99(T_i - 1)e^{-0.028v} & 1 < T_i < 3 \\ (2.997T_i^2 + 17.99T_i - 44.99)e^{-0.028v} & 3 < T_i < 7 \\ 35.99(T_i - 7)e^{-0.028v} & 7 < T_i < 8 \\ 270e^{-0.028v} & 7 < T_i < 8 \end{cases} \quad (1)$$

where M is power torque; v is a vehicle speed; $T_i$ is driver input torque; W is an influence factor of the vehicle speed; and e is a natural logarithm.

Further, specific expressions of the ideal variable transmission ratio curve designed in step (1) are:

$$i_d = \left( \frac{14}{1 + e^{-\frac{v-58}{10}}} + 10 \right) f(\delta_w) \text{ and} \quad (2)$$

$$f(\delta_w) = \begin{cases} -0.5 \times \left[ 0.25 \times \sin\left(\delta_{w1}^2 - \frac{\pi}{2}\right) - 1.75 \right] & \delta_w \le \delta_{w1} \\ -0.5 \times \left[ 0.25 \times \sin\left(\delta_w^2 - \frac{\pi}{2}\right) - 1.75 \right] & \delta_{w1} < \delta_w < \delta_{w2} \\ -0.5 \times \left[ 0.25 \times \sin\left(\delta_{w2}^2 - \frac{\pi}{2}\right) - 1.75 \right] & \delta_w \ge \delta_{w2} \end{cases} \quad (3)$$

where $i_d$ is an ideal steering transmission ratio; f is a transmission ratio adjustment function; $\delta_w$ is an angle of a steering wheel, and counterclockwise is positive; and $\delta_{w1}$ and $\delta_{w2}$ are angle adjustment thresholds of the steering wheel.

Further, step (2) specifically includes:

(21) if the function selection is steer-by-wire, and the steering system is in the electric power steering state, controlling, by the electronic control unit, the shift fork drive motor to rotate counterclockwise to drive the shift fork screw to rotate, such that the shift fork nut makes linear motion and applies power to an end face of the synchronizing ring, at this time, the synchronizing ring is disengaged from the rotor A and is only connected to the rotor B, so as to disconnect the mechanical connection of the system, and the system is changed into the steer-by-wire state, where the rotor A is used to simulate road sensing, and the rotor B and a power motor are used to perform a steering operation of a driver; and

(22) if the function selection is electric power steering, and the steering system is in the steer-by-wire state, controlling, by the electronic control unit, the shift fork drive motor to rotate clockwise to drive the shift fork screw to rotate, such that the shift fork nut makes linear motion, and applies power to the end face of the synchronizing ring, at this time, a part of the synchronizing ring is gradually transitioned from the rotor B to the rotor A, the rotor A and the rotor B are connected to the synchronizing ring at the same time, and the steering system returns to the electric power steering state, where output torque of the rotor A, the rotor B and the power motor is used for steering power assistance at the same time to achieve maximum steering power of the system.

Further, the steps of steering control in the different steering function states in step (3) are:

(31) if the steering system is in the electric power steering state:

(311) collecting, by the sensors, a torque signal, an angle signal and a vehicle speed signal;

(312) receiving, by the electronic control unit, the signals collected in step (311), and calculating required power torque in real time according to the steering power characteristic curve; and (313) controlling, by the electronic control unit, a dual-rotor motor module to perform steering power assistance in conjunction with the required power torque calculated in step (312), controlling, when the required power torque exceeds an optimal load range of the dual-rotor motor module, the power motor to start for power assistance, and controlling, when the required power torque exceeds an optimal load range of the power motor, the power motor to enter an overload state preferably to ensure that the dual-rotor motor module can deal with a steering operation after function switching, and ensure feasibility of active intervention of an advanced driver assistance algorithm, such that driving safety of the vehicle is improved; and

(32) if the steering system is in the steer-by-wire state:

(321) collecting, by the sensors, the torque signal, the angle signal, the vehicle speed signal and a current signal;

(322) calculating, by the electronic control unit, an ideal variable transmission ratio and power torque required to be output by the power motor according to the collected sensor signals, in conjunction with the ideal variable transmission ratio curve and the steering power characteristic curve; and (323) after an angle required to be output by the rotor B is calculated in conjunction with the ideal variable transmission ratio and the power torque required by the power motor obtained in step (322), controlling, by the electronic control unit, the rotor B to track the angle and the power motor to track the power torque respectively, and at the same time, controlling, by the electronic control unit, the rotor A to generate driving sensing in real time according to real-time feedback torque of the rotor B returned by the torque sensor.

Further, step (4) specifically includes:

(41) detecting, by the electronic control unit, the current signal and the torque signal in real time, performing fault diagnosis in real time according to a signal state, performing, if it is diagnosed that a fault occurs, fault-tolerant control, and at the same time, setting the advanced driver assistance algorithm to a state of no active intervention;

(42) if a fault diagnosis result in step (41) is that the rotor A is faulty, controlling, by the electronic control unit, the shift fork drive motor to rotate to drive the synchronizing ring to move closer to the rotor A for progressive control, that is, the position of the steering wheel is determined according to the signal of the steering angle sensor, if the steering wheel is in a middle position, the synchronizing ring is driven to be synchronized immediately, and if the steering wheel is not in the middle position, the synchronizing ring is only pressed against the rotor A, such that time is provided for the steering wheel to return to the middle position while road sensing is ensured to a certain extent;

(43) if the fault diagnosis result in step (41) is that the rotor B is faulty, controlling, by the electronic control unit, the power motor to perform high torque overload output and track the required angle, at the same time, controlling the shift fork drive motor to drive the synchronizing ring to press against the rotor A for progressive control until the steering wheel returns to the middle position, and synchronizing the synchronizing ring immediately;

(44) if the diagnosis result in step (41) is that the power motor is faulty, controlling, by the electronic control unit, the rotor B to perform high torque overload output and track the required angle, at the same time, controlling the shift fork drive motor to drive the synchronizing ring to press against the rotor A for progressive control until the steering wheel returns to the middle position, and synchronizing the synchronizing ring immediately; and

(45) if the diagnosis result in step (41) is another type of fault, controlling, by the electronic control unit, the shift fork drive motor to drive the synchronizing ring to be synchronized immediately, connecting to a mechanical structure, controlling a faultless power mechanism to perform power assistance, and controlling, if the required power torque exceeds the maximum power torque that the faultless power mechanism can provide, only the faultless power mechanism to output the maximum power torque.

Further, a fault diagnosis method in step (41) is: determining the signal state in a current sensor, comparing the signal with a signal at the previous moment, and if there is no signal or the signal fluctuates abnormally several consecutive times, considering that the rotor A, the rotor B or the power motor is faulty.

The present application has the beneficial effects as follows: the embodiments of the present application integrate the steer-by-wire technology and the electric power steering technology by adopting the dual-rotor motor and the common motor for combined power assistance.

1. By adopting the form of a dual-motor power at the input end of the recirculating ball steering gear, power torque can be maximized, electrification of the steering system for commercial vehicles can be achieved, and at the same time, due to the mechanism design from the shift fork drive motor to the synchronizing ring, switching of different steering functions can be more smooth and intelligent.

2. The steer-by-wire function can be provided, and the driver can adapt to the steer-by-wire technology in advance, which further promotes the implementation of the steer-by-wire technology.

3. The steer-by-wire function provided by the steering system according to the embodiment of the present application makes it possible to actively intervene in the operation of the driver, such that active rollover prevention and active collision avoidance functions can be achieved, and the safety of commercial vehicles is further improved. Finally, the redundancy of the steering system is extremely high due to the form of the dual-motor power and the dual-rotor motor in the system, which further ensures the reliability of the steering system.

Figure 1:
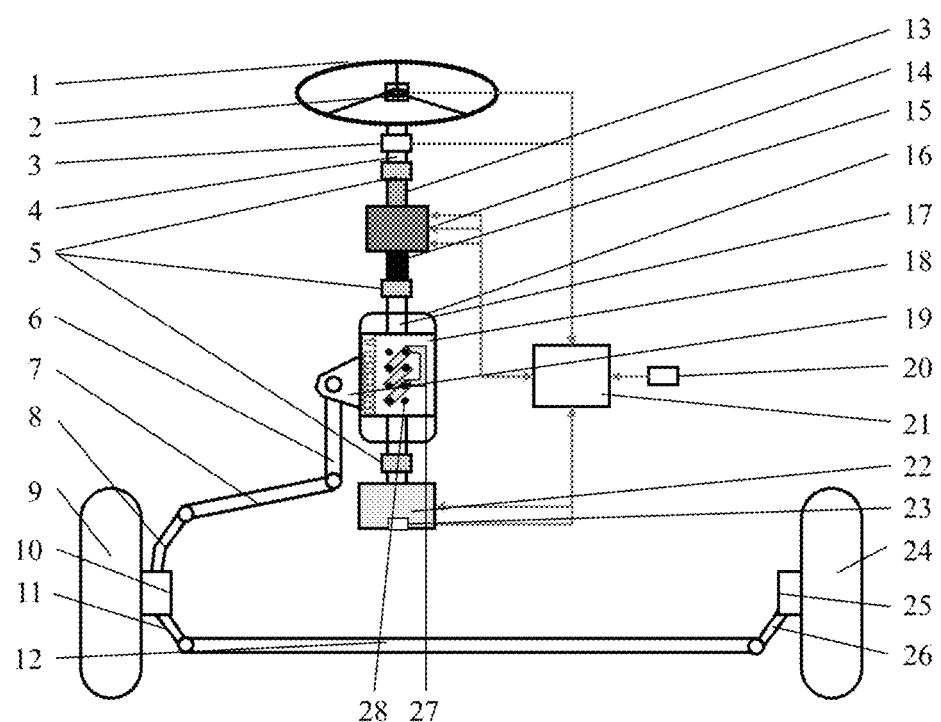
FIG. 1 is a structural diagram of a multifunctional electric recirculating ball steering system for a commercial vehicle according to an embodiment of the present application.
Figure 2:
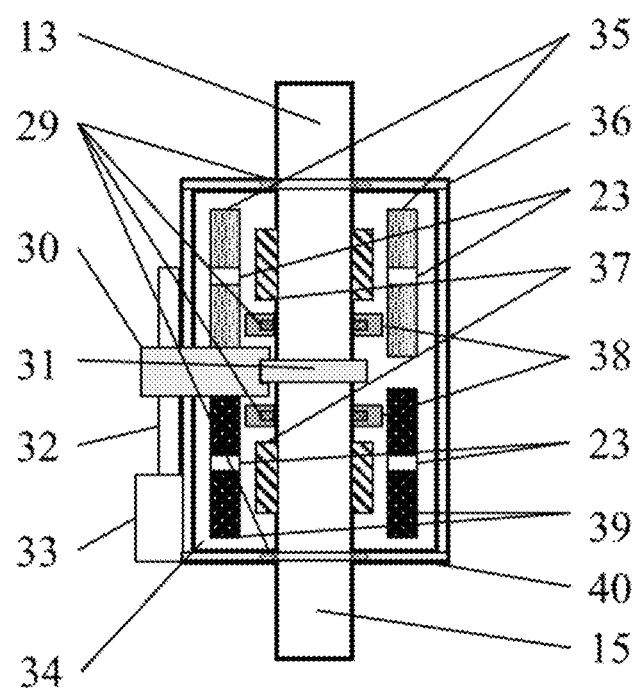
FIG. 2 is a structural diagram of a dual-rotor motor module in a steering system according to an embodiment of the present application.
Figure 3:
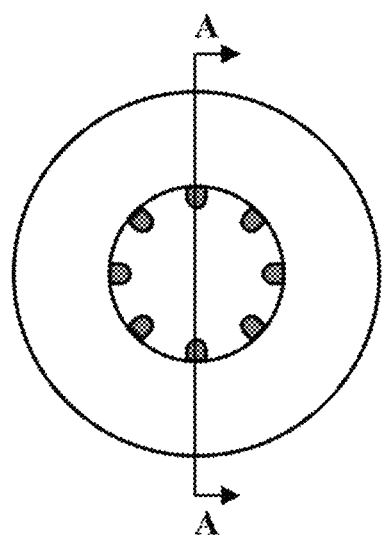
FIG. 3 is a front view of a synchronizing ring according to an embodiment of the present application.
Figure 4:
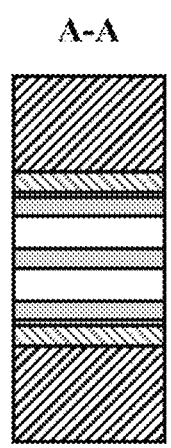
FIG. 4 is a cross-sectional view of a synchronizing ring in a direction A-A according to an embodiment of the present application.
Figure 5:
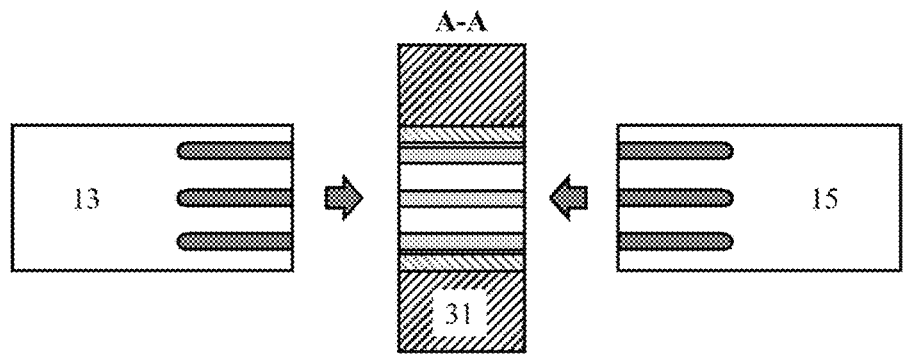
FIG. 5 is a schematic diagram of connection and cooperation of a rotor A, a rotor B and a synchronizing ring according to an embodiment of the present application.

In the figures: 1—Steering wheel, 2—Steering angle sensor, 3—Torque sensor, 4—Steering shaft, 5—Coupling, 6—Gear sector shaft, 7—Steering drag link, 8—Steering knuckle arm, 9—Left wheel, 10—Left steering knuckle, 11—Left tie rod arm, 12—Steering tie rod, 13—Rotor A, 14—Dual-rotor motor module, 15—Rotor B, 16—Recirculating ball steering gear, 17—Steering screw, 18—Steering nut, 19—Gear sector, 20—Vehicle speed sensor, 21—Electronic control unit (ECU), 22—Power motor, 23—Current sensor, 24—Right wheel, 25—Right steering knuckle, 26—Right tie rod arm, 27—Conduit, 28—Recirculating ball, 29—Bearing, 30—Shift fork nut, 31—Synchronizing ring, 32—Shift fork screw, 33—Shift fork drive motor, 34—Stator, 35—Stator winding A, 36—Top cover, 37—Permanent magnet, 38—Bearing block, 39—Stator winding B, and 40—Bottom cover.

DETAILED DESCRIPTION OF THE INVENTION

In order to facilitate the understanding of those skilled in the art, the present disclosure will be further described below in conjunction with the embodiments and the accompanying drawings, and the contents mentioned in the embodiments are not intended to limit the present disclosure.

Referring to FIG. 1 to FIG. 5, a multifunctional electric recirculating ball steering system for commercial vehicles according to the present disclosure includes: an electric power module, a mechanical transmission module and a control module.

The electric power module includes: a dual-rotor motor module 14 and a power motor 22.

The dual-rotor motor module includes: a rotor A 13, a top cover 36, a stator 34, a stator winding A 35, a stator winding B 39, permanent magnets 37, bearings 29, a bearing block 38, a rotor B 15, a synchronizing ring 31, a shift fork nut 30, a shift fork screw 32, a shift fork drive motor 33, and a bottom cover 40.

The top cover 36 and the bottom cover 40 are installed at two ends of the stator 34 respectively.

The stator winding A 35 and the stator winding B 39 are wound inside the stator 34.

The permanent magnets 37 are installed on the rotor A 13 and the rotor B 15 respectively.

The rotor A 13 is located in an inner cavity of the stator 34, two ends of the rotor A are sleeved with the bearings 29 respectively, one end is supported in the top cover 36, and the other end is supported on the bearing block 38.

The rotor B 15 is located in the inner cavity of the stator 34, two ends of the rotor B are sleeved with the bearings 29 respectively, one end is supported in the bottom cover 40, and the other end is supported on the bearing block 38.

Two ends of the synchronizing ring 31 are in floating connection with the rotor A 13 and the rotor B 15 respectively.

The shift fork nut 30 is screwed on the shift fork screw 32, and a free end of the shift fork nut acts on a ring surface of the synchronizing ring 31.

The shift fork drive motor 33 is fixed outside the stator 34, and an output end of the shift fork drive motor is fixedly connected to an input end of the shift fork screw 32.

The mechanical transmission module includes: a steering wheel 1, a steering shaft 4, couplings 5, a recirculating ball steering gear 16, a gear sector 19, a gear sector shaft 6, a steering drag link 7, a steering tie rod 12, a steering knuckle arm 8, a left tie rod arm 11, a right tie rod arm 26, a left steering knuckle 10, a right steering knuckle 25, a left wheel 9 and a right wheel 24.

The recirculating ball steering gear 16 includes: a steering screw 17, a steering nut 18, a conduit 27, and recirculating balls 28.

The conduit 27 is installed in the steering nut 18, and the plurality of recirculating balls 28 are disposed in the conduit 27.

The steering nut 18 is screwed on the steering screw 17, and the steering nut and the steering screw transmit power via the recirculating balls 28. The steering nut 18 is engaged with the gear sector 19.

An input end of the steering shaft 4 is connected to the steering wheel 1, and an output end of the steering shaft is connected to an output end of the rotor A 13 via the coupling 5.

One input end of the steering screw 17 is connected to an output end of the rotor B 15 via the coupling 5, and the other input end of the steering screw is connected to an output end of the power motor 22 via the coupling 5.

The gear sector 19 is fixed to the gear sector shaft 6 for transmission of power output by the steering nut 18.

An input end of the steering drag link 7 is connected to the gear sector shaft 6, and an output end of the steering drag link is connected to the steering knuckle arm 8.

The left steering knuckle 10 is connected to the left wheel 9, and the steering knuckle arm 8 and the left tie rod arm 11 are fixed to the left steering knuckle.

Two ends of the steering tie rod 12 are connected to the left tie rod arm 11 and the right tie rod arm 26 respectively.

The right steering knuckle 25 is connected to the right wheel 24, and the right tie rod arm 26 is fixed to the right steering knuckle.

The control module includes: an electronic control unit (ECU) 21, torque sensors 3, a vehicle speed sensor 20, a steering angle sensor 2 and current sensors 23.

An input end of the electronic control unit 21 is electrically connected to the torque sensor 3, the vehicle speed sensor 20, the steering angle sensor 2 and the current sensor 23 respectively, an output end of the electronic control unit is electrically connected to the power motor 22 and the dual-rotor motor module 14 respectively, and steering function selection and power control are performed according to vehicle and system state parameters obtained from each the sensors during steering.

The torque sensors 3 are installed on the output ends of the steering shaft 4, the rotor A 13, the rotor B 15 and the power motor 22 respectively, to obtain torque signals and to transmit the torque signals to the electronic control unit 21.

The vehicle speed sensor 20 is installed on a vehicle for transmitting an obtained vehicle speed signal to the electronic control unit 21.

The steering angle sensor 2 is installed on the steering wheel 1 for obtaining a steering wheel angle signal when the vehicle is steered, and transmitting the angle signal to the electronic control unit 21.

The current sensors 23 are installed in the stator winding A 35, the stator winding B 39 and the power motor 22 respectively, for obtaining current signals in an installation circuit and transmitting the current signals to the electronic control unit 21.

In a preferred example, the stator winding A 35 and the stator winding B 39 in the dual-rotor motor module have different numbers of coil turns and lengths, that is, output torque of the rotor A 13 is different from output torque of the rotor B 15, and the output torque of the rotor A 13 is smaller than the output torque of the rotor B 15.

In a preferred example, the synchronizing ring 31 is in floating connection with the rotor A 13 and the rotor B 15 via a spline.

In a preferred example, the shift fork drive motor 33 is a low-power direct current motor, such that the cost and size are reduced.

In a preferred example, an output end face of the steering nut 18 is processed into a rack shape and is engaged with the gear sector.

In a preferred example, it may be ensured that the steering screw 17 in the recirculating ball steering gear 16 is completely symmetrical during manufacturing, and a size is be longer than an original size, such that two ends of the steering screw can be connected to the rotor B 15 and the power motor 22 respectively.

In a preferred example, a default function selection of the steering system is electric power steering, that is, an initial state of the system is that the synchronizing ring 31 is connected to the rotor A 13 and the rotor B 15 at the same time, and the rotor A and the rotor B are equivalent to a part of the steering shaft.

In a preferred example, function selection of the steering system is divided into active selection and passive selection, where active selection may be implemented by setting function selection buttons on the steering wheel, and passive selection is passive safety selection performed by an advanced driver assistance algorithm layer according to a vehicle state.

Figure 6:
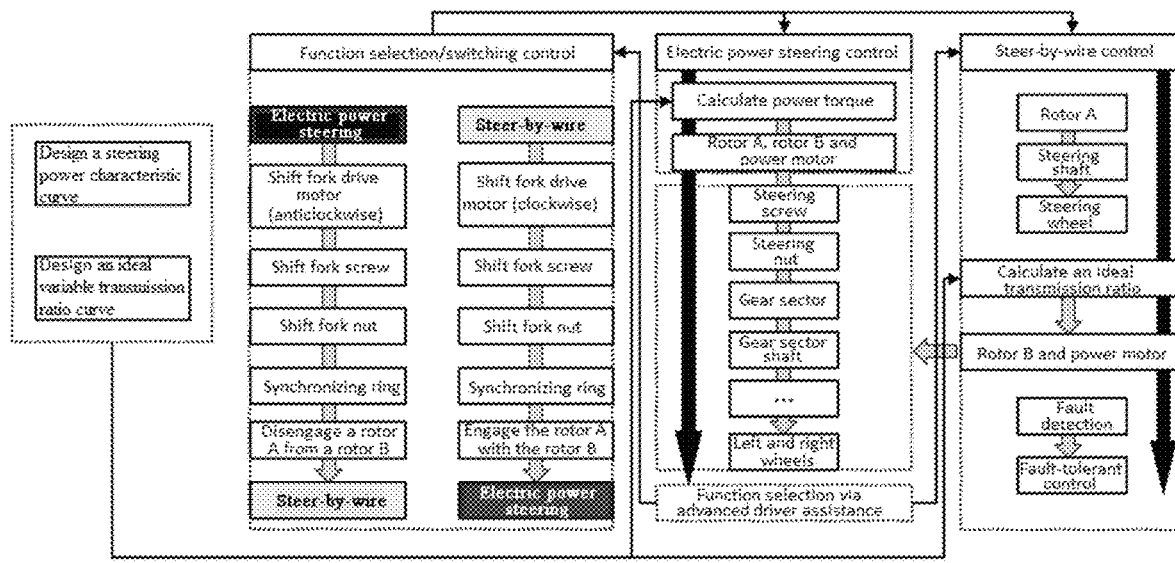
FIG. 6 is a flowchart of a control method of a steering system according to an embodiment of the present application.

Referring to FIG. 6, the present disclosure further provides a control method of a multifunctional electric recirculating ball steering system for commercial vehicles. The method is based on the above system, and includes the following steps:

(1) A steering power characteristic curve when the steering system is in an electric power steering state, and an ideal variable transmission ratio curve when the steering system is in a steer-by-wire state are designed.

The designed steering power characteristic curve is a multi-segment power characteristic curve, and a specific expression is:

$$M(v, T_i) = W(v) \times M(T_i) = \begin{cases} 0 & 0 < T_i < 1 \\ 17.99(T_i - 1)e^{-0.028v} & 1 < T_i < 3 \\ (2.997T_i^2 + 17.99T_i - 44.99)e^{-0.028v} & 3 < T_i < 7 \\ 35.99(T_i - 7)e^{-0.028v} & 7 < T_i < 8 \\ 270e^{-0.028v} & 7 < T_i < 8 \end{cases} \quad (1)$$

where M is power torque; v is a vehicle speed; $T_i$ is driver input torque; W is an influence factor of the vehicle speed; and e is a natural logarithm.

Specific expressions of the designed ideal variable transmission ratio curve are:

$$i_d = \left(\frac{14}{1 + e^{-\frac{v-58}{10}}} + 10\right) f(\delta_w) \text{ and} \quad (2)$$

$$f(\delta_w) = \begin{cases} -0.5 \times \left[0.25 \times \sin\left(\delta_{w1}^2 - \frac{\pi}{2}\right) - 1.75\right] & \delta_w \leq \delta_{w1} \\ -0.5 \times \left[0.25 \times \sin\left(\delta_w^2 - \frac{\pi}{2}\right) - 1.75\right] & \delta_{w1} < \delta_w < \delta_{w2} \\ -0.5 \times \left[0.25 \times \sin\left(\delta_{w2}^2 - \frac{\pi}{2}\right) - 1.75\right] & \delta_w \geq \delta_{w2} \end{cases} \quad (3)$$

where $i_d$ is an ideal steering transmission ratio; f is a transmission ratio adjustment function; $\delta_w$ is an angle of a steering wheel, and counterclockwise is positive; and $\delta_{w1}$ and $\delta_{w2}$ are angle adjustment thresholds of the steering wheel.

(2) Function selection is performed for the steering system, a shift fork drive motor is controlled by an electronic control unit to operate according to a selected function, and function switching is performed. The specific steps are:

(21) If the function selection is steer-by-wire, and the steering system is in the electric power steering state, the shift fork drive motor is controlled by the electronic control unit to rotate counterclockwise to drive the shift fork screw to rotate, such that the shift fork nut makes linear motion and applies power to an end face of a synchronizing ring, at this time, the synchronizing ring is disengaged from a rotor A and is only connected to the rotor B, so as to disconnect mechanical connection of the system, and the system is changed into the steer-by-wire state. The rotor A is used to simulate road sensing, and the rotor B and a power motor are used to perform a steering operation of a driver.

(22) If the function selection is electric power steering, and the steering system is in the steer-by-wire state, the shift fork drive motor is controlled by the electronic control unit to rotate clockwise to drive the shift fork screw to rotate, such that the shift fork nut makes linear motion, and applies power to the end face of the synchronizing ring, at this time, a part of the synchronizing ring is gradually transitioned from the rotor B to the rotor A, the rotor A and the rotor B are connected to the synchronizing ring at the same time, and the steering system returns to the electric power steering state. Output torque of the rotor A, the rotor B, and the power motor is used for steering power assistance at the same time to achieve maximum steering power of the system.

(3) Real-time steering control is performed by the electronic control unit according to the function state of the steering system selected in step (2) in conjunction with the steering power characteristic curve and the ideal variable transmission ratio curve in the different steering function states designed in step (1).

The steps of steering control in the different steering function states are:

(31) if the steering system is in the electric power steering state:

(311) a torque signal, an angle signal and a vehicle speed signal are collected by sensors;

(312) the signals collected in step (311) are received by the electronic control unit, and required power torque is calculated in real time according to the steering power characteristic curve; and (313) a dual-rotor motor module is controlled by the electronic control unit to perform steering power assistance in conjunction with the required power torque calculated in step (312), when the required power torque exceeds an optimal load range of the dual-rotor motor module, a power motor is controlled to start for power assistance, and when the required power torque exceeds an optimal load range of the power motor, the power motor is controlled to enter an overload state preferably to ensure that the dual-rotor motor module can deal with a steering operation after function switching, and ensure feasibility of active intervention of an advanced driver assistance algorithm, such that driving safety of the vehicle is improved; and

(32) if the steering system is in the steer-by-wire state:

(321) the torque signal, the angle signal, the vehicle speed signal and a current signal are collected by the sensors;

(322) an ideal variable transmission ratio and power torque required to be output by the power motor are calculated by the electronic control unit in real time according to the collected sensor signals, in conjunction with the ideal variable transmission ratio curve and the steering power characteristic curve; and (323) after an angle required to be output by the rotor B is calculated in conjunction with the ideal variable transmission ratio and the power torque required by the power motor obtained in step (322), the rotor B is controlled by the electronic control unit to track the angle and the power motor to track the power torque respectively, and at the same time, the rotor A is controlled by the electronic control unit to generate driving sensing in real time according to real-time feedback torque of the rotor B returned by a torque sensor.

(4) If the steering system is in the steer-by-wire state, real-time fault diagnosis is performed by the electronic control unit, and fault-tolerant control of the steering system is performed according to a type of a system fault. The specific steps are:

(41) the current signal and the torque signal are detected by the electronic control unit in real time, fault diagnosis is performed in real time according to a signal state, if it is diagnosed that a fault occurs, fault-tolerant control is performed, and at the same time, an advanced driver assistance algorithm is set to a state of no active intervention;

(42) if a fault diagnosis result in step (41) is that the rotor A is faulty, the shift fork drive motor is controlled by the electronic control unit to rotate to drive the synchronizing ring to move closer to the rotor A for progressive control, that is, the position of the steering wheel is determined according to the signal of the steering angle sensor, if the steering wheel is in a middle position, the synchronizing ring is driven to be synchronized immediately, and if the steering wheel is not in the middle position, the synchronizing ring is only pressed against the rotor A, such that time is provided for the steering wheel to return to the middle position while road sensing is ensured to a certain extent;

(43) if the fault diagnosis result in step (41) is that the rotor B is faulty, the power motor is controlled by the electronic control unit to perform high torque overload output and the required angle is tracked, at the same time, the shift fork drive motor is controlled to drive the synchronizing ring to press against the rotor A for progressive control until the steering wheel returns to the middle position, and the synchronizing ring is synchronized immediately;

(44) if the diagnosis result in step (41) is that the power motor is faulty, the rotor B is controlled by the electronic control unit to perform high torque overload output and the required angle is tracked, at the same time, the shift fork drive motor is controlled to drive the synchronizing ring to press against the rotor A for progressive control until the steering wheel returns to the middle position, and the synchronizing ring is synchronized immediately; and

(45) if the diagnosis result in step (41) is another type of fault, the shift fork drive motor is controlled by the electronic control unit to drive the synchronizing ring to be synchronized immediately, a mechanical structure is connected, a faultless power mechanism is controlled to perform power assistance, and if the required power torque exceeds the maximum power torque that the faultless power mechanism can provide, only the faultless power mechanism is controlled to output the maximum power torque.

A fault diagnosis method in step (41) is: the signal state in a current sensor is determined, the signal is compared with a signal at the previous moment, and if there is no signal or the signal fluctuates abnormally several consecutive times, it is considered that the rotor A, the rotor B or the power motor is faulty.

(5) If the steering system is in the electric power steering state, and it is detected that the vehicle is in a dangerous state and an active intervention operation is required, the shift fork drive motor is controlled by the electronic control unit to drive the synchronizing ring to immediately disengage from the rotor A, so as to disconnect the mechanical connection, and the active intervention operation is completed.

The present disclosure has many specific application ways, and the above are only preferred embodiments of the present disclosure. It should be pointed out that for those of ordinary skill in the art, several improvements can be made without departing from the principle of the present disclosure, and these improvements should also be considered as falling within the protection scope of the present disclosure.

The invention claimed is:

1. A multifunctional electric recirculating ball steering system for commercial vehicles, comprising: an electric power module, a mechanical transmission module and a control module, wherein the electric power module comprises: a dual-rotor motor module (14) and a power motor (22);

the dual-rotor motor module comprises: a rotor A (13), a top cover (36), a stator (34), a stator winding A (35), a stator winding B (39), permanent magnets (37), bearings (29), a bearing block (38), a rotor B (15), a synchronizing ring (31), a shift fork nut (30), a shift fork screw (32), a shift fork drive motor (33), and a bottom cover (40);

the top cover (36) and the bottom cover (40) are installed at two ends of the stator (34) respectively;

the stator winding A (35) and the stator winding B (39) are wound inside the stator (34);

the permanent magnets (37) are installed on the rotor A (13) and the rotor B (15) respectively;

the rotor A (13) is located in an inner cavity of the stator (34), two ends of the rotor A are sleeved with the bearings (29) respectively, one end is supported in the top cover (36), and the other end is supported on the bearing block (38);

the rotor B (15) is located in the inner cavity of the stator (34), two ends of the rotor B are sleeved with the bearings (29) respectively, one end is supported in the bottom cover (40), and the other end is supported on the bearing block (38);

two ends of the synchronizing ring (31) are in floating connection with the rotor A (13) and the rotor B (15) respectively;

the shift fork nut (30) is screwed on the shift fork screw (32), and a free end of the shift fork nut acts on a ring surface of the synchronizing ring (31);

the shift fork drive motor (33) is fixed outside the stator (34), and an output end of the shift fork drive motor is fixedly connected to an input end of the shift fork screw (32);

the mechanical transmission module comprises: a steering wheel (1), a steering shaft (4), couplings (5), a recirculating ball steering gear (16), a gear sector (19), a gear sector shaft (6), a steering drag link (7), a steering tie rod (12), a steering knuckle arm (8), a left tie rod arm (11), a right tie rod arm (26), a left steering knuckle (10), a right steering knuckle (25), a left wheel (9) and a right wheel (24);

the recirculating ball steering gear (16) comprises: a steering screw (17), a steering nut (18), a conduit (27), and recirculating balls (28);

the conduit (27) is installed in the steering nut (18), and a plurality of recirculating balls (28) are disposed in the conduit (27);

the steering nut (18) is screwed on the steering screw (17), and the steering nut and the steering screw transmit power via the recirculating balls (28); the steering nut (18) is engaged with the gear sector (19);

an input end of the steering shaft (4) is connected to the steering wheel (1), and an output end of the steering shaft is connected to an output end of the rotor A (13) via the coupling (5);

one input end of the steering screw (17) is connected to an output end of the rotor B (15) via the coupling (5), and the other input end of the steering screw is connected to an output end of the power motor (22) via the coupling (5);

the gear sector (19) is fixed to the gear sector shaft (6) for transmission of power output by the steering nut (18);

an input end of the steering drag link (7) is connected to the gear sector shaft (6), and an output end of the steering drag link is connected to the steering knuckle arm (8);

the left steering knuckle (10) is connected to the left wheel (9), and the steering knuckle arm (8) and the left tie rod arm (11) are fixed to the left steering knuckle;

two ends of the steering tie rod (12) are connected to the left tie rod arm (11) and the right tie rod arm (26) respectively;

the right steering knuckle (25) is connected to the right wheel (24), and the right tie rod arm (26) is fixed to the right steering knuckle;

the control module comprises: an electronic control unit (21), torque sensors (3), a vehicle speed sensor (20), a steering angle sensor (2) and current sensors (23);

an input end of the electronic control unit (21) is electrically connected to the torque sensor (3), the vehicle speed sensor (20), the steering angle sensor (2) and the current sensor (23) respectively, an output end of the electronic control unit is electrically connected to the power motor (22) and the dual-rotor motor module (14) respectively, and steering function selection and power control are performed according to vehicle and system state parameters obtained from each sensor during steering;

the torque sensors (3) are installed on the output ends of the steering shaft (4), the rotor A (13), the rotor B (15) and the power motor (22) respectively, to obtain torque signals and to transmit the torque signals to the electronic control unit (21);

the vehicle speed sensor (20) is installed on a vehicle for transmitting an obtained vehicle speed signal to the electronic control unit (21);

the steering angle sensor (2) is installed on the steering wheel (1) for obtaining a steering wheel angle signal when the vehicle is steered, and transmitting the angle signal to the electronic control unit (21); and the current sensors (23) are installed in the stator winding A (35), the stator winding B (39) and the power motor (22) respectively, for obtaining current signals in an installation circuit and transmitting the current signals to the electronic control unit (21).

2. The multifunctional electric recirculating ball steering system for commercial vehicles according to claim 1, wherein the stator winding A (35) and the stator winding B (39) in the dual-rotor motor module have different numbers of coil turns and lengths, that is, output torque of the rotor A (13) is different from output torque of the rotor B (15), and the output torque of the rotor A (13) is smaller than the output torque of the rotor B (15).

3. The multifunctional electric recirculating ball steering system for commercial vehicles according to claim 1, wherein the synchronizing ring (31) is in floating connection with the rotor A (13) and the rotor B (15) via a spline.

4. The multifunctional electric recirculating ball steering system for commercial vehicles according to claim 1, wherein an output end face of the steering nut (18) is processed into a rack shape and is engaged with the gear sector (19).

5. The multifunctional electric recirculating ball steering system for commercial vehicles according to claim 1, wherein a default function selection of the steering system is electric power steering, that is, an initial state of the system is that the synchronizing ring is connected to the rotor A (13) and the rotor B (15) at the same time, and the rotor A (13) and the rotor B (15) are equivalent to a part of the steering shaft.

6. A control method of a multifunctional electric recirculating ball steering system for commercial vehicles, based on the system according to claim 1, comprising the following steps:
  (1) designing a steering power characteristic curve when the steering system is in an electric power steering state, and an ideal variable transmission ratio curve when the steering system is in a steer-by-wire state;
  (2) performing function selection for the steering system, controlling, by the electronic control unit, the shift fork drive motor to operate according to a selected function, and performing function switching;
  (3) performing, by the electronic control unit, real-time steering control according to the function state of the steering system selected in step (2) in conjunction with the steering power characteristic curve and the ideal variable transmission ratio curve in the different steering function states designed in step (1);
  (4) if the steering system is in the steer-by-wire state, performing, by the electronic control unit, real-time fault diagnosis, and performing fault-tolerant control of the steering system according to a system fault; and
  (5) if the steering system is in the electric power steering state, and the vehicle is in a dangerous state is detected and an active intervention operation is required, controlling, by the electronic control unit, the shift fork drive motor to drive the synchronizing ring to immediately disengage from the rotor A, so as to disconnect mechanical connection, and completing the active intervention operation.

7. The control method of a multifunctional electric recirculating ball steering system for commercial vehicles according to claim 6, wherein the steering power characteristic curve designed in step (1) is a multi-segment power characteristic curve, and a specific expression is:

$$M(v, T_i) = \qquad (1)$$

$$W(v) \times M(T_i) = \begin{cases} 0 & 0 < T_i < 1 \\ 17.99(T_i - 1)e^{-0.028v} & 1 < T_i < 3 \\ (2.997T_i^2 + 17.99T_i - 44.99)e^{-0.028v} & 3 < T_i < 7 \\ 35.99(T_i - 7)e^{-0.028v} & 7 < T_i < 8 \\ 270e^{-0.028v} & 7 < T_i < 8 \end{cases}$$

where M is power torque; v is a vehicle speed; T is driver input torque; W is an influence factor of the vehicle speed; and e is a natural logarithm.

8. The control method of a multifunctional electric recirculating ball steering system for commercial vehicles according to claim 7, wherein specific expressions of the ideal variable transmission ratio curve designed in step (1) are:

$$i_d = \left( \frac{14}{1 + e^{-\frac{v-58}{10}}} + 10 \right) f(\delta_w) \text{ and} \qquad (2)$$

$$f(\delta_w) = \begin{cases} -0.5 \times \left[ 0.25 \times \sin\left(\delta_{w1}^2 - \frac{\pi}{2}\right) - 1.75 \right] & \delta_w \leq \delta_{w1} \\ -0.5 \times \left[ 0.25 \times \sin\left(\delta_w^2 - \frac{\pi}{2}\right) - 1.75 \right] & \delta_{w1} < \delta_w < \delta_{w2} \\ -0.5 \times \left[ 0.25 \times \sin\left(\delta_{w2}^2 - \frac{\pi}{2}\right) - 1.75 \right] & \delta_w \geq \delta_{w2} \end{cases} \qquad (3)$$

where $i_d$ is an ideal steering transmission ratio; f is a transmission ratio adjustment function; $\delta_w$ is an angle of a steering wheel, and counterclockwise is positive; and $\delta_{w1}$ and $\delta_{w2}$ are angle adjustment thresholds of the steering wheel.

9. The control method of a multifunctional electric recirculating ball steering system for commercial vehicles according to claim 6, wherein step (2) specifically comprises:
  (21) if the function selection is steer-by-wire, and the steering system is in the electric power steering state, controlling, by the electronic control unit, the shift fork drive motor to rotate counterclockwise to drive the shift fork screw to rotate, such that the shift fork nut makes linear motion and applies power to an end face of the synchronizing ring, at this time, the synchronizing ring is disengaged from the rotor A and is only connected to the rotor B, so as to disconnect the mechanical connection of the system, and the system is changed into the steer-by-wire state, wherein the rotor A is used to simulate road sensing, and the rotor B and a power motor are used to perform a steering operation of a driver; and
  (22) if the function selection is electric power steering, and the steering system is in the steer-by-wire state, controlling, by the electronic control unit, the shift fork drive motor to rotate clockwise to drive the shift fork screw to rotate, such that the shift fork nut makes linear motion, and applies power to the end face of the synchronizing ring, at this time, a part of the synchronizing ring is gradually transitioned from the rotor B to the rotor A, the rotor A and the rotor B are connected to the synchronizing ring at the same time, and the steering system returns to the electric power steering state, wherein output torque of the rotor A, the rotor B and the power motor is used for steering power assistance at the same time to achieve maximum steering power of the system.

10. The control method of a multifunctional electric recirculating ball steering system for commercial vehicles according to claim 6, wherein the steps of steering control in the different steering function states in step (3) are:
  (31) if the steering system is in the electric power steering state:
  (311) collecting, by the sensors, a torque signal, an angle signal and a vehicle speed signal;
  (312) receiving, by the electronic control unit, the signals collected in step (311), and calculating required power torque in real time according to the steering power characteristic curve; and
  (313) controlling, by the electronic control unit, a dual-rotor motor module to perform steering power assistance in conjunction with the required power torque calculated in step (312), controlling, when the required power torque exceeds an optimal load range of the dual-rotor motor module, the power motor to start for power assistance, and controlling, when the required power torque exceeds an optimal load range of the power motor, the power motor to enter an overload state preferably to ensure that the dual-rotor motor module can deal with a steering operation after function switching, and ensure feasibility of active intervention of an advanced driver assistance algorithm, such that driving safety of the vehicle is improved; and (32) if the steering system is in the steer-by-wire state:

(321) collecting, by the sensors, the torque signal, the angle signal, the vehicle speed signal and a current signal;

(322) calculating, by the electronic control unit, an ideal variable transmission ratio and power torque required to be output by the power motor according to the collected sensor signals, in conjunction with the ideal variable transmission ratio curve and the steering power characteristic curve; and (323) after an angle required to be output by the rotor B is calculated in conjunction with the ideal variable transmission ratio and the power torque required by the power motor obtained in step (322), controlling, by the electronic control unit, the rotor B to track the angle and the power motor to track the power torque respectively, and at the same time, controlling, by the electronic control unit, the rotor A to generate driving sensing in real time according to real-time feedback torque of the rotor B returned by the torque sensor.

* * * * *